United States Patent
Li et al.

(10) Patent No.: US 10,098,021 B2
(45) Date of Patent: Oct. 9, 2018

(54) VOLTE QUALITY OF SERVICE ENHANCEMENT WITH PRECONDITIONS

(71) Applicant: Apple Inc., Cupertino, CA (US)

(72) Inventors: Si Li, San Jose, CA (US); Deepak Chitlur Lakshman, San Jose, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 14/724,567

(22) Filed: May 28, 2015

(65) Prior Publication Data

US 2016/0353315 A1    Dec. 1, 2016

(51) Int. Cl.
*H04W 24/04* (2009.01)
*H04W 28/02* (2009.01)

(52) U.S. Cl.
CPC ....... *H04W 24/04* (2013.01); *H04W 28/0263* (2013.01); *H04W 28/0215* (2013.01); *H04W 28/0252* (2013.01)

(58) Field of Classification Search
CPC . H04W 24/02; H04W 24/04; H04W 28/0215; H04W 28/0236; H04W 28/0252; H04W 36/0022; H04W 36/14; H04W 76/026; H04W 76/028; H04W 48/18; H04W 88/06; H04L 12/50; H04L 12/66; H04L 65/1006; H04L 65/1069; H04L 65/1016; H04M 7/0003; H04M 7/006; H04M 7/0066; H04M 7/123; H04M 15/56; H04M 2207/187

See application file for complete search history.

(56) References Cited

U.S. PATENT DOCUMENTS 6,282,192 B1 * 8/2001 Murphy .............. H04L 12/5692
                                                          370/238
6,385,451 B1 * 5/2002 Kalliokulju .......... H04W 36/28
                                                          370/331

(Continued)

OTHER PUBLICATIONS

Share Technote; "IMS/SIP Precondition"; http://www.sharetechnote.com/html/IMS_SIP_Precondition.html; retrieved Jul. 1, 2015; 15 pages.

*Primary Examiner* — Eric Nowlin
(74) *Attorney, Agent, or Firm* — Meyertons Hood Kivlin Kowert & Goetzel, P.C.; Jeffrey C. Hood; Matthew C. Washburn

(57) ABSTRACT

A wireless voice call may be established between an originating user equipment (UE) and a terminating UE, via a cellular network, using preconditions. The originating UE may transmit an invitation for a packet-switched wireless voice call, beginning a first period of time. The terminating UE may cancel the invitation in response to determining that a first precondition, such as establishment of a dedicated bearer between the originating UE and the cellular network, is not satisfied within the first period of time. The first period of time may be interrupted in response to determining that the first precondition is satisfied, and a second period of time may then begin. The cellular network may cancel the invitation in response to determining that a second precondition, such as establishment of a dedicated bearer between the terminating UE and the cellular network, is not satisfied within the second period of time.

16 Claims, 5 Drawing Sheets

(56) References Cited

U.S. PATENT DOCUMENTS

| | | | |
|---|---|---|---|
| 6,608,832 B2 * | 8/2003 | Forslow | H04L 63/083 370/229 |
| 6,781,983 B1 * | 8/2004 | Armistead | H04L 12/5692 370/352 |
| 6,816,464 B1 * | 11/2004 | Scott | H04L 41/142 370/238 |
| 7,212,810 B2 * | 5/2007 | Babbar | H04W 88/06 370/342 |
| 7,330,453 B1 * | 2/2008 | Borella | H04L 12/14 370/338 |
| 7,386,316 B2 * | 6/2008 | Shieh | H04L 29/06027 375/E7.013 |
| 7,394,786 B2 * | 7/2008 | Virtanen | H04W 28/24 370/329 |
| 7,623,508 B2 * | 11/2009 | Khoury | H04L 12/5692 370/352 |
| 7,657,262 B2 * | 2/2010 | Grayson | H04W 36/14 370/311 |
| 7,801,529 B2 * | 9/2010 | Enzmann | H04W 36/24 370/331 |
| 8,467,792 B2 * | 6/2013 | Fiore | H04W 36/0022 370/331 |
| 8,554,830 B2 * | 10/2013 | Wynn | H04L 63/08 709/203 |
| 8,611,266 B2 * | 12/2013 | Cho | H04W 76/048 370/311 |
| 8,630,667 B2 * | 1/2014 | Ramasamy | H04W 68/12 370/328 |
| 8,755,335 B2 * | 6/2014 | Cantu | H04N 21/6137 370/329 |
| 8,792,365 B2 * | 7/2014 | Chin | H04W 36/0066 370/252 |
| 8,804,518 B2 * | 8/2014 | Manpuria | H04W 72/005 370/235 |
| 8,908,678 B1 * | 12/2014 | McGonigal | H04W 28/0268 370/352 |
| 9,106,382 B1 * | 8/2015 | Ray | H04W 4/22 |
| 9,107,188 B2 * | 8/2015 | Manpuria | H04W 72/005 |
| 9,215,684 B2 * | 12/2015 | Faccin | H04W 60/06 |
| 9,264,299 B1 * | 2/2016 | Palmer | H04L 41/0654 |
| 9,265,084 B2 * | 2/2016 | Khay-Ibbat | H04W 76/028 |
| 9,282,569 B2 * | 3/2016 | Zhang | H04W 72/1215 |
| 9,319,959 B2 * | 4/2016 | White | H04W 36/30 |
| 9,332,128 B2 * | 5/2016 | Backhaus | H04L 65/1046 |
| 9,344,933 B1 * | 5/2016 | Velusamy | H04W 24/04 |
| 9,433,030 B2 * | 8/2016 | Shukair | H04W 76/045 |
| 9,538,421 B1 * | 1/2017 | Chan | H04L 1/1607 |
| 9,699,732 B2 * | 7/2017 | Kim | H04W 52/0222 |
| 9,986,101 B2 * | 5/2018 | King | H04M 7/006 |
| 2002/0128017 A1 * | 9/2002 | Virtanen | H04W 28/24 455/452.2 |
| 2002/0141386 A1 * | 10/2002 | Minert | H04M 7/066 370/352 |
| 2003/0039237 A1 * | 2/2003 | Forslow | H04L 63/083 370/352 |
| 2003/0091024 A1 * | 5/2003 | Stumer | H04M 3/42323 370/352 |
| 2004/0032857 A1 * | 2/2004 | Tannan | H04L 41/145 370/351 |
| 2004/0252697 A1 * | 12/2004 | Wille | H04W 24/00 370/395.21 |
| 2005/0047337 A1 * | 3/2005 | Virtanen | H04W 28/24 370/229 |
| 2005/0083899 A1 * | 4/2005 | Babbar | H04W 88/06 370/342 |
| 2005/0083909 A1 * | 4/2005 | Kuusinen | H04L 12/6418 370/352 |
| 2005/0152339 A1 * | 7/2005 | Scott | H04L 41/142 370/352 |
| 2005/0226193 A1 * | 10/2005 | Karhinienni | H04W 28/24 370/338 |
| 2005/0239444 A1 * | 10/2005 | Shieh | H04L 29/06027 455/414.1 |
| 2007/0091898 A1 | 4/2007 | Rengaraju et al. | |
| 2007/0147315 A1 * | 6/2007 | Khoury | H04W 92/02 370/338 |
| 2010/0182912 A1 * | 7/2010 | Hongisto | H04L 47/15 370/242 |
| 2010/0202368 A1 * | 8/2010 | Hans | H04M 3/5116 370/329 |
| 2010/0287285 A1 | 11/2010 | Castellanos Zamora et al. | |
| 2011/0096706 A1 * | 4/2011 | Ramasamy | H04W 68/12 370/310 |
| 2011/0149855 A1 * | 6/2011 | Cho | H04W 76/048 370/328 |
| 2011/0176528 A1 * | 7/2011 | Lu | H04W 84/00 370/338 |
| 2011/0211439 A1 * | 9/2011 | Manpuria | H04W 72/005 370/216 |
| 2013/0183988 A1 * | 7/2013 | Zhang | H04W 72/1215 455/450 |
| 2013/0235985 A1 * | 9/2013 | Christoff | H04M 7/0069 379/90.01 |
| 2014/0071888 A1 * | 3/2014 | Khay-Ibbat | H04W 76/028 370/328 |
| 2014/0119209 A1 * | 5/2014 | Joul | H04W 36/0022 370/252 |
| 2014/0133455 A1 * | 5/2014 | Hallenstal | H04L 65/1016 370/331 |
| 2014/0146685 A1 * | 5/2014 | Faccin | H04W 60/00 370/241 |
| 2014/0179238 A1 * | 6/2014 | Wynn | H04L 41/5067 455/67.11 |
| 2014/0219083 A1 * | 8/2014 | Mandyam | H04W 76/005 370/230 |
| 2014/0219272 A1 * | 8/2014 | Shuman | H04L 65/1016 370/352 |
| 2014/0269625 A1 * | 9/2014 | Surface | H04W 36/0083 370/332 |
| 2014/0321393 A1 * | 10/2014 | Manpuria | H04W 72/005 370/329 |
| 2014/0328217 A1 * | 11/2014 | Bollapragada | H04W 8/02 370/259 |
| 2014/0364118 A1 * | 12/2014 | Belghoul | H04W 4/003 455/435.1 |
| 2015/0003411 A1 * | 1/2015 | Sandhu | H04W 36/0022 370/331 |
| 2015/0063261 A1 * | 3/2015 | Kim | H04M 3/00 370/329 |
| 2015/0098316 A1 * | 4/2015 | Ku | H04W 8/26 370/218 |
| 2015/0098464 A1 * | 4/2015 | Cohen | H04M 3/42289 370/355 |
| 2015/0117401 A1 * | 4/2015 | Jiang | H04W 36/0022 370/331 |
| 2015/0131619 A1 * | 5/2015 | Zhu | H04W 36/0022 370/332 |
| 2015/0195751 A1 * | 7/2015 | Aoyagi | H04W 36/0022 370/230 |
| 2015/0201454 A1 * | 7/2015 | Shukair | H04W 76/045 370/329 |
| 2015/0271176 A1 * | 9/2015 | Wei | H04W 52/0209 455/411 |
| 2015/0271336 A1 * | 9/2015 | Backhaus | H04L 65/1046 379/211.02 |
| 2015/0281438 A1 * | 10/2015 | Kotecha | H04L 65/1046 370/259 |
| 2015/0304828 A1 * | 10/2015 | Varoglu | H04W 4/16 455/414.1 |
| 2015/0304990 A1 * | 10/2015 | Manpuria | H04W 72/005 370/329 |
| 2015/0312857 A1 * | 10/2015 | Kim | H04W 52/0222 370/311 |
| 2015/0373574 A1 * | 12/2015 | Gordon | H04L 41/5067 370/252 |
| 2015/0382267 A1 * | 12/2015 | Wang | H04W 28/08 455/436 |

(56) References Cited

U.S. PATENT DOCUMENTS

| | | | |
|---|---|---|---|
| 2016/0021673 A1* | 1/2016 | Ahmadzadeh | H04W 72/085 370/331 |
| 2016/0029199 A1* | 1/2016 | Shi | H04B 1/3816 455/432.1 |
| 2016/0044568 A1* | 2/2016 | White | H04W 36/30 370/332 |
| 2016/0057607 A1* | 2/2016 | Dubesset | H04W 8/12 455/433 |
| 2016/0057676 A1* | 2/2016 | White | H04W 36/0022 370/333 |
| 2016/0072955 A1* | 3/2016 | Barkan | H04M 3/42212 455/417 |
| 2016/0087913 A1* | 3/2016 | Wang | H04L 47/805 370/230 |
| 2016/0142931 A1* | 5/2016 | Mondal | H04L 67/141 370/252 |
| 2016/0191363 A1* | 6/2016 | Haraszti | H04L 41/0896 709/223 |
| 2016/0191631 A1* | 6/2016 | Haraszti | H04L 41/0896 709/227 |
| 2016/0212600 A1* | 7/2016 | Backhaus | H04W 4/16 |
| 2016/0219024 A1* | 7/2016 | Verzun | H04L 63/102 |
| 2016/0234749 A1* | 8/2016 | Singh | H04W 36/0022 |
| 2016/0242106 A1* | 8/2016 | Ueki | H04W 4/22 |
| 2016/0255513 A1* | 9/2016 | Lihosit | H04W 24/02 |
| 2016/0262058 A1* | 9/2016 | Jeong | H04W 36/0005 |
| 2016/0330655 A1* | 11/2016 | Vashi | H04W 36/0022 |
| 2016/0353316 A1* | 12/2016 | Boettger | H04W 36/0022 |
| 2016/0381598 A1* | 12/2016 | Chan | H04L 1/1607 370/474 |
| 2017/0019934 A1* | 1/2017 | Yang | H04L 61/1529 |
| 2017/0163811 A1* | 6/2017 | Barkan | H04M 3/543 |
| 2017/0181048 A1* | 6/2017 | Shah | H04W 36/14 |
| 2017/0187873 A1* | 6/2017 | Engelke | H04M 3/42391 |
| 2017/0187874 A1* | 6/2017 | Engelke | H04M 3/42391 |
| 2017/0237783 A1* | 8/2017 | Yang | H04L 65/1083 370/331 |
| 2017/0280503 A1* | 9/2017 | He | H04W 76/066 |

* cited by examiner

VOLTE QUALITY OF SERVICE ENHANCEMENT WITH PRECONDITIONS

TECHNICAL FIELD

The present application relates to wireless devices, and more particularly to quality of service in establishing voice communications for a wireless device capable of both packet-switched and circuit-switched voice communications.

DESCRIPTION OF THE RELATED ART

The use of wireless communication systems is rapidly expanding. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

One example of a transition to next generation wireless technology is the transition from circuit-switched (CS) technology to packet-switched (PS) technology, such as voice over LTE (VoLTE), for conducting voice calls. VoLTE technology utilizes a fully packet-switched network and may provide benefits such as improved audio quality (e.g., HD voice) and simultaneous voice and data communications for CDMA carriers. Many operators around the world have deployed VoLTE technology and continue to enhance their VoLTE coverage. However, in some scenarios, e.g., due to network congestion or poor signal quality, VoLTE users may experience dropped calls and/or long delays in call establishment.

Accordingly, improvements in wireless communications, specifically in the handling of VoLTE services, would be desirable. In particular, it would be desirable to improve the reliability and speed of establishing VoLTE communications.

SUMMARY

In light of the foregoing and other concerns, some embodiments relate to one or more user equipment (UE) devices and cellular network devices that are configured to improve reliability of packet-switched voice technologies, such as VoLTE.

A UE is presented, which may comprise at least one antenna, a radio coupled to the at least one antenna for performing wireless cellular communications, and at least one processing element coupled to the radio. The UE may be configured to transmit an invitation for a packet-switched wireless voice call, and, for a first time period, monitor for one or more predefined connection conditions pertaining to a connection between the UE and a cellular network of the packet-switched wireless voice call. The one or more predefined connection conditions may comprise the UE determining that the UE has met a desired quality-of-service criterion for the packet-switched wireless voice call. The UE may be further comprised to cancel the packet-switched wireless voice call in response to determining that the one or more predefined connection conditions have not occurred within the first time period, but to interrupt the first time period in response to determining that the one or more predefined connection conditions have occurred within the first time period.

The one or more predefined connection conditions may further comprise the UE transmitting an indication that the UE has met the desired quality-of-service criterion for the packet-switched wireless voice call. The UE may be further configured to receive an indication that a terminating UE of the packet-switched wireless voice call has met one or more second predefined connection conditions, wherein establishment of the packet-switched voice call is completed in response to the indication that the terminating UE has met the one or more second predefined connection conditions. The receiving the indication that the terminating UE has met the one or more second predefined connection conditions may occur after the UE transmitting the indication that the UE has met the desired quality-of-service criterion for the packet-switched wireless voice call.

The desired quality-of-service criterion may comprise establishing a dedicated bearer between the UE and the cellular network.

The UE may be further configured to transmit an invitation for a circuit-switched wireless voice call substantially immediately following the canceling the packet-switched wireless voice call.

The UE may be further configured to establish a packet-switched wireless voice session with the cellular network at least partly based on a determination that the one or more predefined connection conditions have occurred within the first time period, and receive an indication that a terminating UE of the packet-switched wireless voice call has not met one or more second predefined connection conditions, wherein the cellular network establishes a voice call between the UE and the terminating UE by establishing a circuit-switched wireless voice session with the terminating UE, wherein the establishing the circuit-switched wireless voice session is at least partly based on the terminating UE not having met the one or more second predefined connection conditions.

A method is presented for establishing a voice call between an originating user equipment (UE) and a terminating UE, via a cellular network. The method may comprise the originating UE transmitting, to a cellular network, an invitation for a packet-switched wireless voice call, and attempting establishment of a first dedicated bearer between the originating UE and the cellular network for the packet-switched wireless voice call. The method may further comprise interrupting a first predetermined time period following the transmitting the invitation in response to determining that the first dedicated bearer has been established within the first predetermined time period following the transmitting the invitation, wherein expiration of the first predetermined time period without being interrupted causes the originating UE to cancel the packet-switched wireless voice call.

Cancelation of the packet-switched wireless voice call may cause the originating UE to transmit an invitation for a circuit-switched wireless voice call to the terminating UE.

The method may further comprise the originating UE transmitting a first indication, indicating that the dedicated bearer has been established between the originating UE and the cellular network, wherein the transmitting the first indication is in response to determining that the dedicated bearer between the originating UE and the cellular network has been established within the first predetermined time period.

The method may further comprise the originating UE receiving a second indication, indicating that a dedicated bearer has been established between the terminating UE and the cellular network, wherein establishment of the packet-switched voice call is completed in response to the second indication. A second predetermined time period may begin in response to the first indication, wherein the second indication is received within the second predetermined time period.

The method may further comprise the originating UE establishing a packet-switched wireless voice session with the cellular network at least partly based on a determination that the first dedicated bearer has been established within the first predetermined time period. The method may further comprise receiving an indication that the terminating UE has not established a second dedicated bearer between the terminating UE and the cellular network for the packet-switched wireless voice call, wherein the cellular network establishes a voice call between the originating UE and the terminating UE by establishing a circuit-switched wireless voice session with the terminating UE, wherein the establishing a circuit-switched wireless voice session is at least partly based on the terminating UE not having established the second dedicated bearer.

A base station is presented, comprising at least one antenna, at least one radio coupled to the at least one antenna for performing wireless cellular communications, and at least one processing element coupled to the at least one radio. The base station may be configured to receive, from a mobile originating UE, an invitation for a packet-switched wireless voice call, and provide the invitation for the packet-switched wireless voice call to a mobile terminating UE. The base station may be further configured to receive, from the mobile originating UE, a first indication that the mobile originating UE has met a first quality-of-service precondition for the packet-switched wireless voice call. The base station may be further configured to cancel establishment of a first leg of the packet-switched voice call between the base station and the mobile terminating UE in response to determining that the mobile terminating UE has not met a second quality-of-service precondition within a predetermined period of time following the receiving the first indication.

The base station may be further configured to transmit an invitation for a circuit-switched wireless voice call to the mobile terminating UE in response to determining that the mobile terminating UE has not met the second quality-of-service precondition within the predetermined period of time. The base station may be further configured to complete establishment of a wireless voice call, wherein a second leg of the wireless voice call between the mobile originating UE and the base station is packet-switched, and the first leg of the wireless voice call between the base station and the mobile terminating UE is circuit-switched.

The base station may be further configured to complete establishment of the packet-switched wireless voice call in response to determining that the mobile terminating UE has met the second quality-of-service precondition within the predetermined period of time following the receiving the first indication.

At least one of the first or second quality-of-service preconditions may comprise establishment of a dedicated bearer for the packet-switched voice call.

Determining that the mobile terminating UE has not met the second quality-of-service precondition may comprise receiving an indication that the mobile terminating UE is providing a user alert of the packet-switched wireless voice call.

The first indication may be received within a predefined time period following the invitation.

Accordingly, embodiments are presented herein of a method for establishing voice calls by UEs, as well as a UE, base station, or other cellular networking hardware configured to implement the method. This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
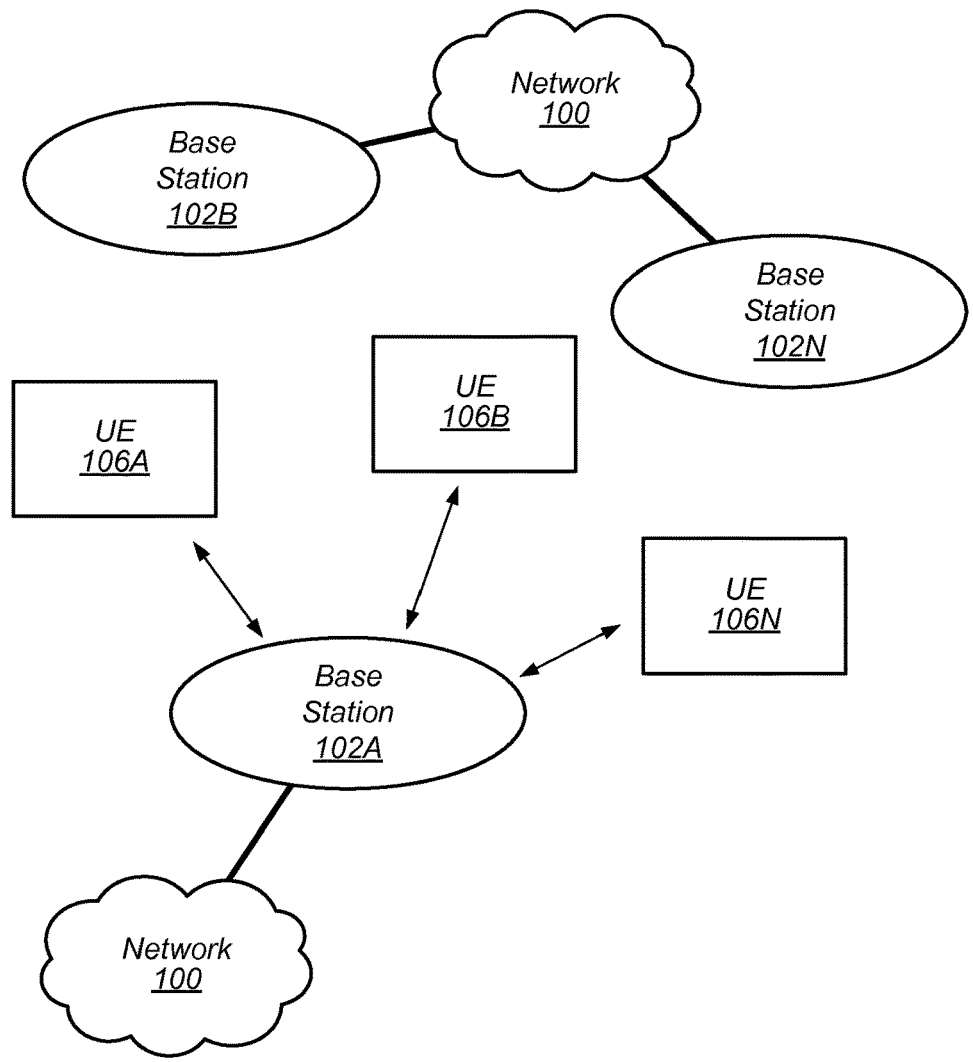
FIG. 1 illustrates an exemplary (and simplified) wireless communication system.

While the embodiments described in this disclosure may be susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF THE EMBODIMENTS

Acronyms

The following acronyms are used in the present Patent Application:

UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PS: Packet-switched
CSFB: Circuit-switched fallback
MME: Mobile Management Entity
MSC: Mobile Switching Center
RNC: Radio Network Controller
OAM: Operations, Administration, and Management
RRC: Radio Resource Control
MO: Mobile Originating
MT: Mobile Terminating
MTRF: Mobile Terminating Roaming Forwarding
IMS: IP Multimedia Subsystem
SDP: Session Description Protocol
SIP: Session Initiation Protocol Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as smart watches, smart glasses, headphones, pendants, earpieces), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
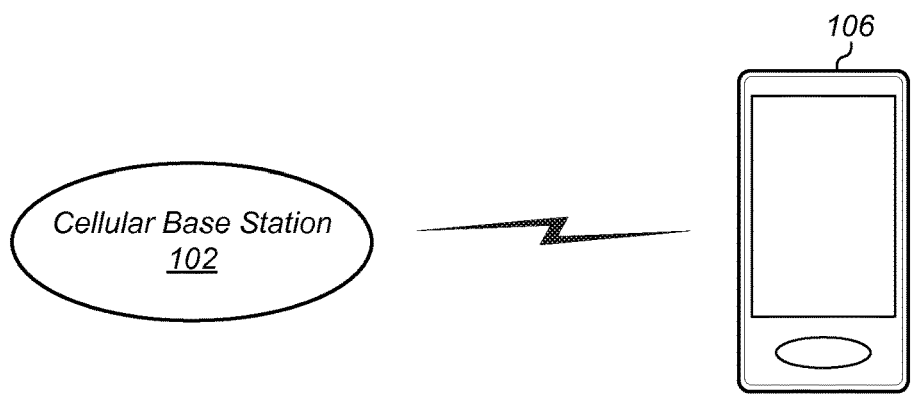
FIG. 2 illustrates a base station in communication with user equipment (UE)
Figure 3:
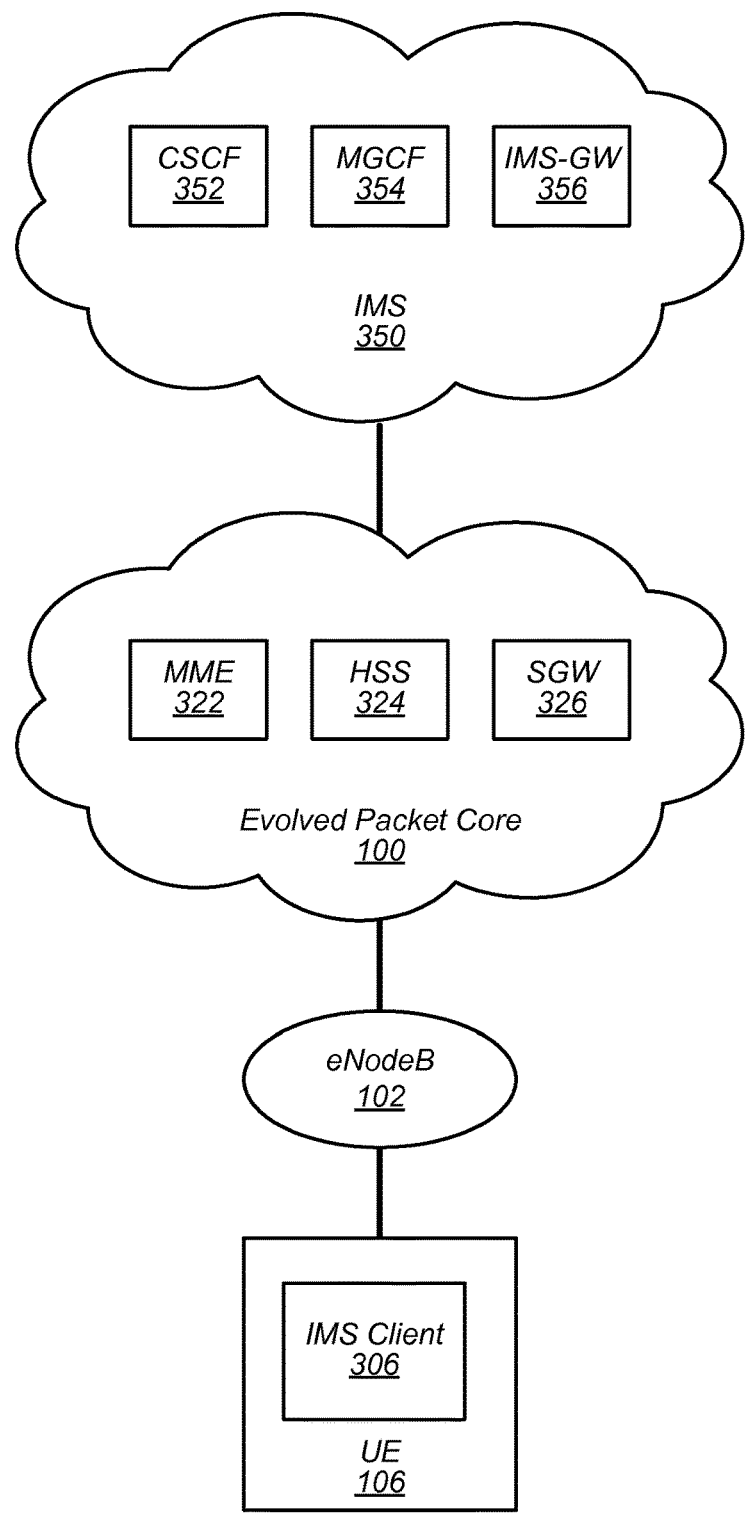
FIG. 3 illustrates an example cellular network system according to some embodiments.

FIGS. 1-3—Communication System

FIG. 1 illustrates a simplified example wireless cellular communication system. It is noted that the system of FIG. 1 is merely one example of a possible cellular communication system, and the present disclosure may be implemented in any of various systems as desired.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100. The communication area (or coverage area) of each base station may be referred to as a "cell." The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or WiFi), WiMAX, etc.

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. As defined above, the UE 106 may be a device with wireless cellular network connectivity such as a mobile phone, a handheld device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof The base station, such as the processing element in the base station, may perform any of the methods described herein, or any portion of any of the method embodiments described herein, as being performed by a base station. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1xRTT, and separate radios for communicating using each of Wi-Fi and Bluetooth. Other configurations are also possible. In some embodiments, the UE 106 may be configured to communicate using a radio access technology which provides both PS services and CS services.

FIG. 3 illustrates an example simplified portion of a wireless communication system that may be particularly useful for implementing voice or video over IP communication, such as voice over LTE (VoLTE) in an LTE network. As shown, the UE 106 may include an IP multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a cellular network, where the cellular network may comprise a base station 102, a core network 100 and an IMS system 350, as shown. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may also include various other devices known to those skilled in the art.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. Similar to the EPC 100, the IMS 350 may also include various other devices known to those skilled in the art.

Operations described herein as being performed by the cellular network may be performed by one or more of the cellular network devices shown in FIG. 3, such as one or more of base station, 102, MME 322, HSS 324, or SGW 326 in EPC 100, or CSCF 352, MGCF 354 or IMS-GW 356 in IMS system 350, among possible others.

Figure 4:
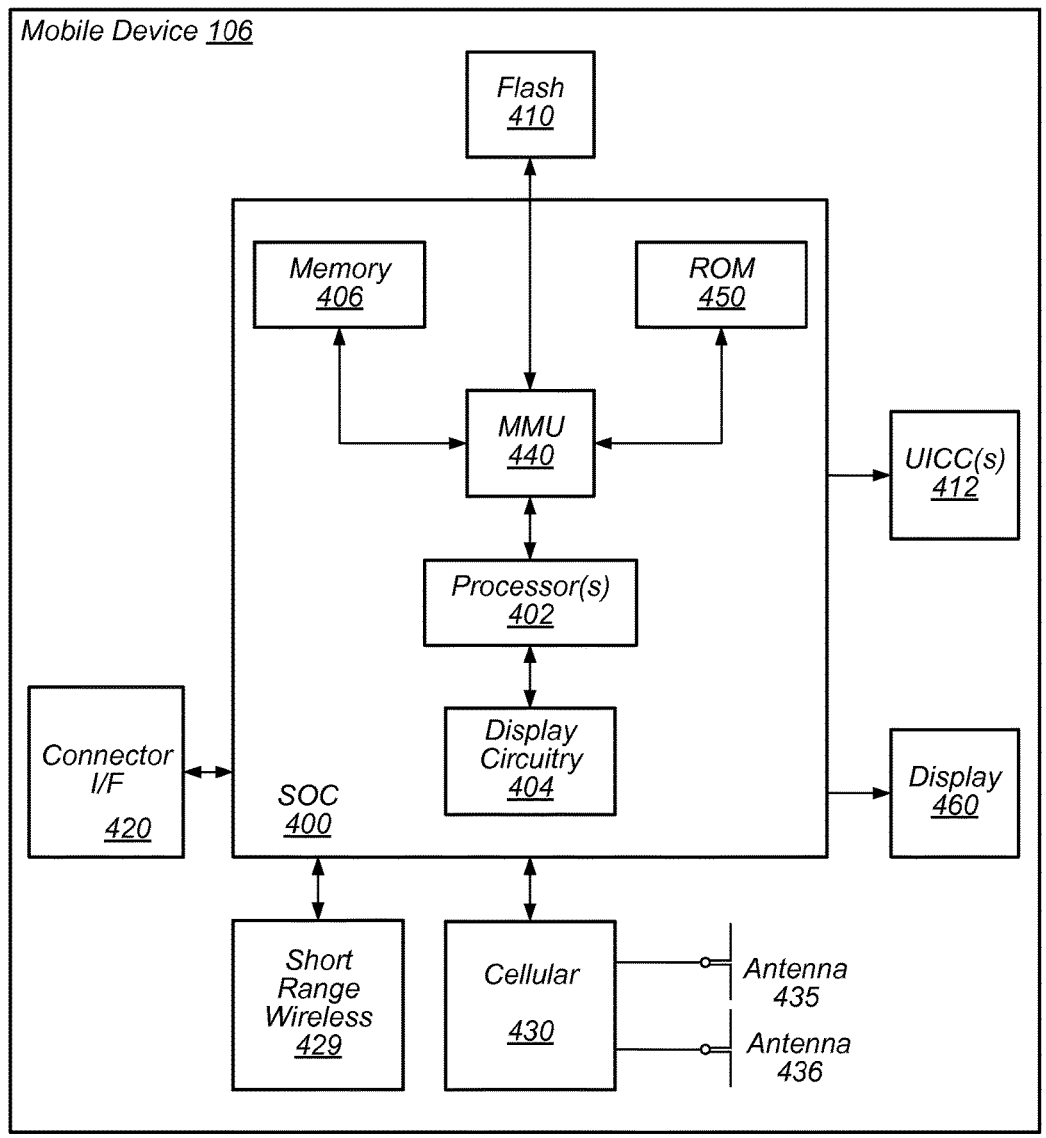
FIG. 4 illustrates an example block diagram of a UE, according to some embodiments.

FIG. 4—Example Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, connector I/F 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, one or more Universal Integrated Circuit Cards (UICCs) storing one or more SIM applications, cellular communication circuitry 430 such as for LTE, GSM, etc., and short range wireless communication circuitry 429 (e.g., Bluetooth™ and WLAN circuitry).

The UE device 106 may include at least one antenna, and in some embodiments multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include hardware and software components for implementing methods according to embodiments of this disclosure.

The processor 402 of the UE device 106 may be configured to implement part or all of the methods described herein, e.g., by executing program instructions stored on a memory medium (e.g., a non-transitory computer-readable memory medium). In other embodiments, processor 402 may be configured as a programmable hardware element, such as an FPGA (Field Programmable Gate Array), or as an ASIC (Application Specific Integrated Circuit).

Figure 5:
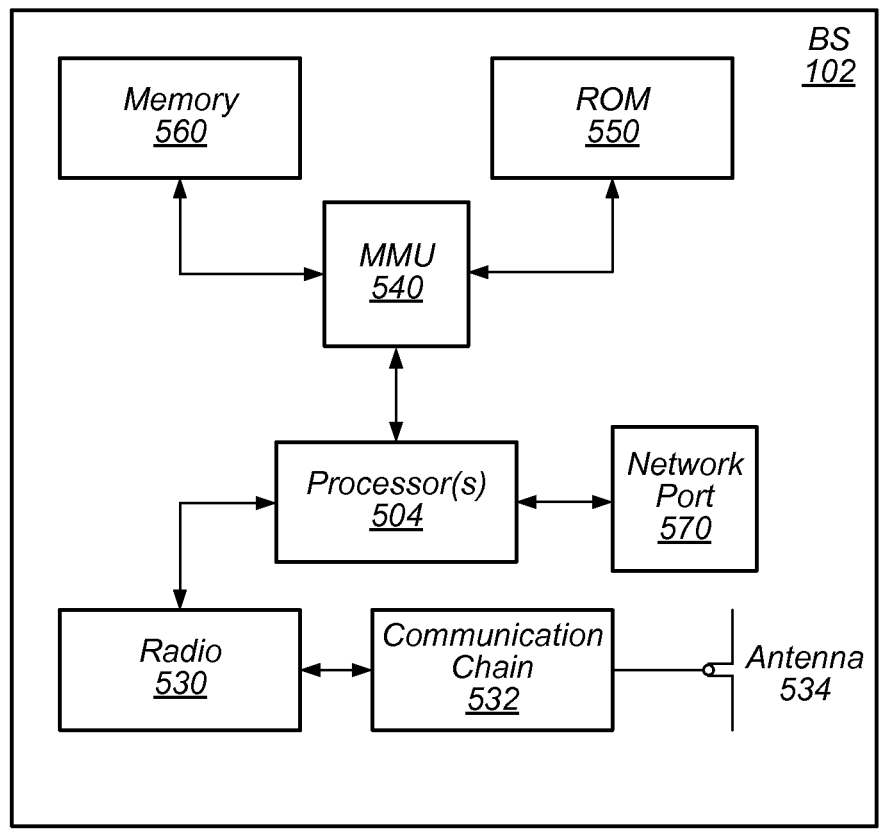
FIG. 5 illustrates an example block diagram of a base station, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

VoLTE Preconditions

To improve the reliability of a packet-switched voice call, such as a VoLTE call, one or more preconditions may be required before establishment of the packet-switched voice call may be completed. A precondition may be a set of constraints about the session. For example, the precondition may include a set of constraints introduced in an initial call request signal, such as a Session Description Protocol (SDP) Offer signal. The recipient of the offer may generate an answer, but may not alert the user or otherwise proceed with session establishment. Session establishment may occur only when the preconditions are met.

Preconditions may be used to meet "quality of service" (QoS) requirements. For example, a precondition may include a constraint that session establishment may not occur for the packet-switched voice call until sufficient network resources have been reserved for the call. As a specific example, the precondition may specify that dedicated bearers be established before alerting the callee of the call offer. Such a precondition may reduce the likelihood of call establishment failing due to insufficient network resources after the callee has been alerted. Such preconditions may be made mandatory by certain providers, depending on their network design.

Because the packet-switched voice call may not be established until the preconditions have been met, failure to meet one or more preconditions may introduce delay in establishing the call. Thus, one or more time windows may be defined during which the preconditions are to be met. For example, if a precondition is not met within a specified window of time, one or more legs of the packet-switched voice call may be canceled. Optionally, a circuit-switched voice call may then be initiated.

In some embodiments, preconditions may be negotiated using SIP signaling/IMS framework, via the SDP offer/answer model as required by the currently defined standards for VoLTE, e.g., RFC 3312.

Figure 6:
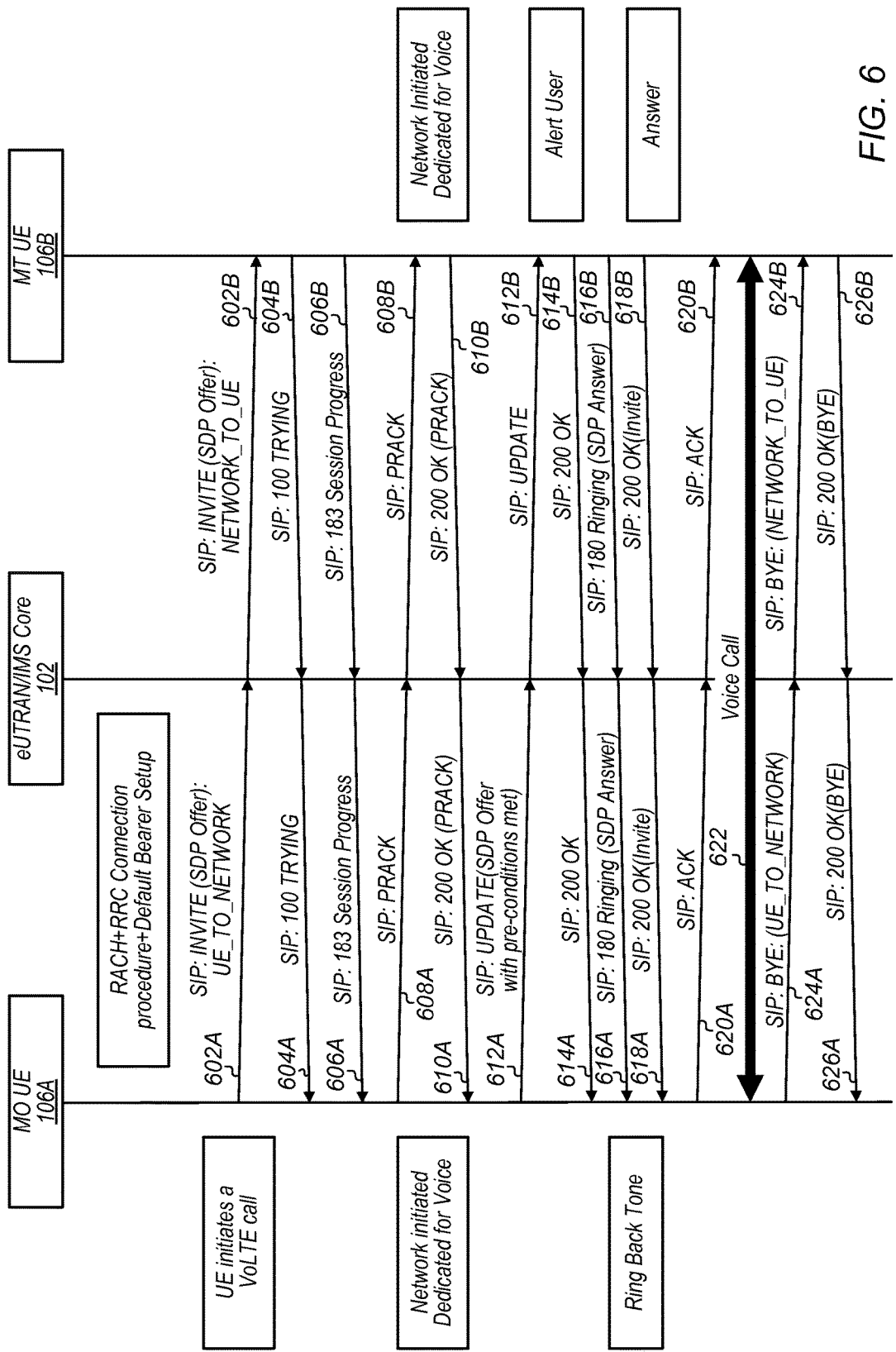
FIG. 6 illustrates an example signal flow during establishment of a packet-switched voice call, using preconditions.

FIG. 6 illustrates an example SIP signal flow during establishment of a packet-switched voice call, such as a VoLTE call, using preconditions. FIG. 6 demonstrates possible behavior of a mobile originating (MO) UE, such as UE 106A, at least one entity of a cellular network (e.g., eUTRAN/IMS core), such as BS 102, and a mobile terminating (MT) UE, such as UE 106B, as time progresses from top to bottom.

The MO 106A may initiate a packet-switched wireless voice call with the MT 106B by transmitting an invitation 602A, such as a SIP:INVITE message. The invitation 602A may be received by the BS 102. In response, the BS 102 may transmit the invitation to the MT 106B, as illustrated by SIP:INVITE message 602B. For example, the BS 102 may relay the invitation, or may partially or entirely decode the invitation and transmit a similar or identical invitation message to the MT 106B. The invitation 602 may include an indication of whether preconditions are required before session establishment may be completed. The invitation 602 may further include an indication of one or more preconditions to be satisfied. For example, the invitation 602 may include an SDP Offer that indicates preconditions.

In the present scenario, the exemplary invitation 602 includes an indication of a precondition requiring establishment of a dedicated bearer before establishment of the packet-switched voice call may be completed (e.g., before the MT 106B may alert the callee of the requested packet-switched voice call). For example, the invitation 602 may include an indication of this precondition by including the following SDP attribute, which indicates that the desired status is that the QoS precondition (i.e., dedicated bearer establishment) be satisfied for both send and receive communication traffic on the local leg of the voice call (i.e., on the leg between the MO 106A and the BS 102), and is mandatory:

a=des:qos mandatory local sendrecv

The invitation 602 may further include an indication of whether the precondition is currently satisfied. In the present scenario, the exemplary invitation 602 includes an indication that the precondition requiring establishment of a dedicated bearer between the MO 106A and the BS 102 has not been satisfied. For example, the invitation 602 may include the following SDP attribute, which indicates that the current status is that the QoS precondition has not been satisfied for either send or receive communication traffic on the local leg of the voice call:

a=curr:qos local none

Upon receiving the invitation 602B, the MT 106B may transmit a provisional response 604B indicating that the MT 106B is taking action toward establishing the call, such as a SIP:100 TRYING message. The provisional response 604B may be received by the BS 102, and in response, the BS 102 may transmit the provisional response to the MT 106B, as illustrated by SIP:100 TRYING message 604A. The provisional response 604A may indicate to the MO 106A that the invitation 602B was properly received by the MT 106B.

Additionally, the MT 106B may transmit an informational message 606B to convey information about the progress of the packet-switched voice call, such as a SIP:183 SESSION PROGRESS message. The informational message 606B may be received by the BS 102, and in response, the BS 102 may transmit the informational message to the MT 106B, as illustrated by SIP:183 SESSION PROGRESS message 606A. The informational message 606 may include an indication of a precondition and/or an indication of whether a precondition is currently satisfied, similar to those included in the invitation 602. For example, the informational message 606 may include an indication that the desired status is that the QoS precondition (i.e., dedicated bearer establishment) be satisfied for both send and receive communication traffic on the local leg of the voice call (i.e., on the leg between the MT 106B and the BS 102), and is mandatory. In the present scenario, the exemplary informational message 606 includes an indication of a precondition requiring establishment of a dedicated bearer between the MT 106B and the BS 102 before establishment of the packet-switched voice call may be completed, as well as an indication that the precondition has not been satisfied.

In response to receiving the informational message 606B, the BS 102 may initiate establishment of dedicated bearers (e.g., evolved packet system (EPS) bearers) for communication with one or both of the MO 106A and the MT 106B. Establishment of dedicated bearers may then be negotiated (or attempted) between the BS 102 and the MO 106A, and/or between the BS 102 and the MT 106B. In some implementations of the present scenario, the initiation of dedicated bearer establishment may be further in response to the BS 102 determining that the invitation 602A included an indication that dedicated bearer establishment is a required precondition or preferred condition for session establishment.

Additional signaling may occur at various points throughout establishment of the packet-switched voice call. For example, in the present scenario, the informational message 606 is illustrated as a SIP provisional response SIP:183 SESSION PROGRESS, which may cause the MO 106A to respond with an acknowledge message 608A, such as a SIP:PRACK message. The acknowledge message 608A may be received by the BS 102, which may then transmit the acknowledge message to the MT 106B, as illustrated by the SIP:PRACK message 608B. According to SIP procedures, the MT 106B may respond to the SIP:PRACK message 608B by transmitting a SIP:200 OK message, as illustrated by the response message 610B, that is responsive to the SIP:PRACK message 608B. The response message 610B may be received by the BS 102, which may transmit the response message to the MO 106A, as illustrated by SIP:200 OK message 610A. In the present scenario, the acknowledge message 608 and the response message 610 may occur concurrently with establishment of the dedicated bearers. In other scenarios, additional or alternative signaling may occur, perhaps involving different communications protocols.

In response to successful establishment of the dedicated bearer between the MO 106A and the BS 102, the MO 106A may transmit an update message 612A, such as a SIP:UPDATE message. The update message 612A may be received by the BS 102, which may transmit the update message to the MT 106B, as illustrated by the SIP:UPDATE message 612B. The update message 612 may indicate that at least a portion of a precondition has been satisfied. For example, the SIP:UPDATE message 612A may include the following SDP attributes:

a=des:qos mandatory local sendrecv
a=curr:qos local sendrecv

The first attribute indicates that the desired status is that the QoS precondition (i.e., dedicated bearer establishment) be satisfied for both send and receive communication traffic on the local leg of the voice call (i.e., on the leg between the MO 106A and the BS 102), and is mandatory. This attribute may be identical to an attribute included in the invitation 602A. The second attribute indicates that the current status is that the QoS precondition has been satisfied for both send and receive communication traffic on the local leg of the voice call.

In response to receiving the update message 612B, the MT 106B may transmit an update response message 614B, such as a SIP:200 OK message, that is responsive to the update message 612B. The update response message 614B may be received by the BS 102, which may transmit the update response message to the MO 106A, as illustrated by the SIP:200 OK message 614A. The update response message 614 may include an indication of whether at least a portion of a precondition has been satisfied. If at least a portion of a precondition has been satisfied, the update response message 614 may include an indication similar or identical to the indication included in the update message 612. For example, the update response message 614 may include an indication that the desired status is that the QoS precondition (i.e., dedicated bearer establishment) be satisfied for both send and receive communication traffic on the local leg of the voice call (i.e., on the leg between the MT 106B and the BS 102), and is mandatory, which indication may be identical to an indication included in the informational message 606. The update response message 614 may further include an indication that the QoS precondition has been satisfied for both send and receive communication traffic on the local leg of the voice call.

Once the preconditions have been satisfied, the MT 106B may alert a user to the packet-switched voice call. For example, the MT 106B may ring or provide any other alert using audible, visible, and/or haptic means, or any other means known in the art. The MT 106B may also transmit an alert indication 616B, such as a SIP:180 RINGING message. The alert indication 616B may be received by the BS 120, which may transmit the alert indication, as illustrated by SIP:180 RINGING message 616A.

In response to receiving user input to answer the packet-switched voice call, the MT 106B may transmit an invitation response message 618B, such as a SIP:200 OK message, that is responsive to the invitation 602. The invitation response message 618B may be received by the BS 102, which may transmit the invitation response message to the MO 106A, as illustrated by the SIP:200 OK message 618A. In response, the MO 106A may transmit an acknowledgement message 620A, such as a SIP:ACK, which may be received by the BS 102 and transmitted to the MT 106B, as illustrated by the SIP:ACK 620B.

Following the acknowledgement 620, media streams may be established, to conduct the packet-switched voice call 622. At the conclusion of the call, the MO 106A may transmit a termination signal 624 via the BS 102. The MT 106B may receive the termination signal 624 and respond with a termination response signal 626B via the BS 102, at which time the packet-switched voice call may be terminated.

In some scenarios, the preconditions relating to the MT 106B, such as establishment of a dedicated bearer between the MT 106B and the BS 102, may not be satisfied at the time the update response 614B is transmitted. Thus, the update response 614B may indicate that a precondition has not been satisfied. This indication may be identical to the indication included in the informational message 606B. In such scenarios, the MT 106B may send a subsequent additional response message (not shown), such as a SIP:200 OK, in response to determining that a precondition has been satisfied. This additional response message may include an indication that the precondition has been satisfied, which may be similar or identical to the indication discussed above with regard to the update response message 614.

In such scenarios, the packet-switched voice call may not be established until all specified preconditions have been satisfied. For example, the user may not be alerted to the packet-switched voice call until the preconditions have all been satisfied, as indicated by the update message 612 (indicating that the preconditions relating to the MO 106A have been satisfied) and a response message, such as one of the update response message 614 or an additional response message (indicating that the preconditions relating to the MT 106B have been satisfied). In this manner, preconditions may be used, e.g., to improve quality of service by assuring that the packet-switched voice call is not established until sufficient resources have been reserved to support the call. However, this may result in delay in establishing the call if one or more preconditions cannot be immediately satisfied.

To prevent the delay from becoming excessive, one or more time windows may be defined during which the preconditions must be satisfied. If the preconditions are not satisfied within the defined time windows, then the packet-switched voice call may fall back to a circuit-switched voice call. For example, failure to satisfy QoS type preconditions, such as establishment of dedicated bearers, within the defined time windows may indicate that the packet-switched network may not have sufficient resources to assure adequate quality of service for a packet-switched voice call at the present time. Thus, a circuit-switched voice call may be preferable to waiting an unknown length of time for resources to become available.

In a first implementation of the present scenario, the transmission of the invitation 602A by the MO 106A may begin a first period of time. For example, upon sending the invitation 602A, the MO 106A may initiate a precondition timer. Alternatively, the MO 106A may note a current time as indicated by a system clock or other timekeeping mechanism. The first period of time may alternatively begin in response to another event occurring near the transmission of the invitation 602A, such as, e.g., receipt of an instruction to transmit the invitation 602A, or receipt of a TCP ACK message from the BS 102 responsive to the invitation 602A. The first period of time may represent a time window within which any specified preconditions relating to the MO 106A must be satisfied. For example, in the present scenario, the first period of time defines a time window within which a dedicated bearer must be established between the MO 106A and the BS 102.

If the dedicated bearer is not established between the MO 106A and the BS 102 within the first period of time (e.g., before the precondition timer reaches a certain value or the system clock records the passage of a predetermined length of time), then the MO 106A may transmit a cancelation signal, such as a SIP:CANCEL message, to cancel the invitation, thus terminating establishment of the packet-switched voice call on both the MO leg and the MT leg. The MO 106A may then initiate a circuit-switched voice call with the MT 106B, e.g., by transmitting a circuit-switched voice call invitation, such as a CS Page. The invitation for the circuit-switched voice call may be transmitted substantially immediately following the canceling the packet-switched wireless voice call. For example, the invitation for the circuit-switched voice call may be transmitted immediately following the transmission of the cancelation signal, or immediately following confirmation or acknowledgement that the cancelation signal has been received or that the packet-switched voice call has been canceled, or within a short time (e.g., within 3 seconds) following these events, to allow the MO 106A to prepare for initiating a circuit-switched voice call.

In this first implementation of the present scenario, the receipt of the invitation 602A by the BS 102 may begin a second period of time. For example, upon receiving the invitation 602A, the BS 102 may initiate a retry timer. Alternatively, the BS 102 may note a current time as indicated by a system clock or other timekeeping mechanism. The second period of time may alternatively begin in response to another event occurring near the receipt of the invitation 602A, such as, e.g., transmission of the invitation 602B, or transmission of a TCP ACK message responsive to the invitation 602A. The second period of time may represent a time window within which any specified preconditions relating to the MT 106B must be satisfied. For example, in the present scenario, the second period of time defines a time window within which a dedicated bearer must be established between the MT 106B and the BS 102.

If the dedicated bearer is not established between the MT 106B and the BS 102 within the second period of time (e.g., before the retry timer reaches a certain value or the system clock records the passage of a predetermined length of time), then the BS 102 may transmit a cancelation signal, such as a SIP:CANCEL message, to cancel the invitation, thus terminating establishment of the packet-switched voice call on the MT leg. The BS 102 may then initiate a circuit-switched voice call with the MT 106B, e.g., by transmitting a circuit-switched voice call invitation, such as a CS Page. The invitation for the circuit-switched voice call may be transmitted substantially immediately following the canceling the packet-switched wireless voice call, as discussed above. If establishment of the packet-switched voice call on the MT leg is canceled by the BS 102, but the packet-switched voice call on the MO leg is not canceled by the MO 106A, then the voice call may be established with the MO leg being packet-switched and the MT leg being circuit-switched.

In this first implementation of the present scenario, the first period of time may be interrupted by receipt of the alert indication 616A by the MO 106A. For example, upon receipt of the alert indication 616A, the MO 106A may stop the precondition timer or otherwise disregard the expiration of the first period of time. Similarly, in this first implementation of the present scenario, the second period of time may be interrupted by receipt of the alert indication 616B by the BS 102. For example, upon receipt of the alert indication 616B, the BS 102 may stop the precondition timer or otherwise disregard the expiration of the second period of time. Because the alert indication 616 is transmitted only once all preconditions have been satisfied, receipt of this message may provide a simple basis for determining that there is no longer a concern that the preconditions may result in excessive delay in establishing the call. Thus, once the alert indication 616 has been transmitted, both the precondition timer and the retry timer may be interrupted, such that no cancelation messages are sent based on the preconditions.

However, this first implementation may result in inefficient functionality in some circumstances if the first period of time and the second period of time are approximately equal in length, because the first and second periods of time may then end at approximately the same point. For example, in some circumstances, the preconditions associated with the MO leg of the packet-switched voice call may be satisfied within the first period of time, but the preconditions associated with the MT leg may not be satisfied within the second period of time. Thus, the MO leg would have sufficient resources to support the packet-switched voice call, even though the MT leg may not. However, because the preconditions associated with the MT leg are not satisfied within the second period of time, the alert indication 616 may not be transmitted until the BS 102 has canceled the MT leg of the packet-switched voice call and established a circuit-switched session for the MT leg of the voice call. If the first period of time and the second period of time are approximately equal in length, this may result in the MO 106A failing to receive the alert indication 616A within the first period of time, which may lead to cancelation of the MO leg of the packet-switched voice call and establishment of the MO leg as a circuit-switched voice call, as discussed above. However, such cancelation of the MO leg of the packet-switched call is unnecessary in light of the satisfaction of the preconditions associated with the MO leg within the first period of time.

As another example, in some circumstances, the preconditions associated with the MO leg may not be satisfied within the first period of time, and the preconditions associated with the MT leg may not be satisfied within the second period of time. If the first period of time and the second period of time are approximately equal in length, this may result in cancelation messages and circuit-switched invitations being sent by both the MO 106A and the BS 102 at approximately the same time. Receipt by the MT 106B of two circuit-switched invitations may cause confusion and delay.

To address this inefficiency, in some circumstances, the first period of time may be defined to be sufficiently longer than the second period of time to allow for establishment of a circuit-switched session for the MT leg of the voice call. However, circuit-switched paging may require more than 7.5 seconds in many situations. Thus, when added to the delay defined for the second period of time (e.g., 10 seconds), this solution may require the first period of time to be over 17.5 seconds. Further, if the MO 106A then determines that the preconditions associated with the MO leg were not satisfied within the first period of time, yet additional delay may then be introduced by establishment of the circuit-switched voice call by the MO 106A, possibly resulting in a total delay of 25 seconds or more. Many users may find such a delay unacceptable.

In some circumstances, this inefficiency and delay may be reduced by configuring the MO 106A and the BS 102 to start and stop the first period of time and the second period of time at different points. For example, in a second implementation of the present scenario, the transmission of the invitation 602A by the MO 106A (or a proximate event) may begin the first period of time, as in the first implementation. However, the first period of time may be interrupted in response to the MO 106A determining that the preconditions associated with the MO leg have been satisfied. Specifically, once the preconditions associated with the MO leg (e.g., establishment of a dedicated bearer between the MO 106A and the BS 102) have been satisfied, there is no longer a concern that those preconditions may result in further delay in establishing the call.

The first period of time may alternatively be interrupted in response to another event occurring near the determination that the MO leg preconditions have been satisfied, such as, e.g., transmission of the update message 612A or receipt of a TCP ACK message from the BS 102 responsive to the update message 612A. Because these events are executed in response to the MO 106A determining that the preconditions associated with the MO leg have been satisfied, the first period of time may be considered to be interrupted based on that determination even where the MO 106A is implemented such that the actual trigger for interrupting the first time period is transmission of the update message 612A or receipt of a TCP ACK message responsive to the update message 612A, or other proximate event.

As in the first implementation, if the MO leg preconditions are not satisfied within the first period of time, then the MO 106A may transmit a cancelation signal canceling both legs of the packet-switched voice call, and initiate a circuit-switched voice call. Thus, the precondition timer of the first time period may prevent excessive delay in establishing a packet-switched voice call in circumstances where the invitation is not received by the BS 102, or where the MO leg preconditions cannot be established in a timely manner. The system may rely on the retry timer of the second period of time to prevent excessive delay due to other circumstances.

In this second implementation, receipt of the update message 612A by the BS 102 may begin the second period of time, during which any specified preconditions relating to the MT 106B must be satisfied. Thus, the second period of time does not begin until the after the MO leg preconditions have been satisfied, which may assure that the first and second periods of time do not end at the same point. As discussed above, the BS 102 may send the update message 612B to the MT 106B, which may respond with the update response message 614B, which may include an indication of whether at least a portion of a precondition has been satisfied (e.g., whether a dedicated bearer has been established between the MT 106B and the BS 102). If the response message 614B indicates that the preconditions have not been satisfied, then the MT 106B may transmit a subsequent additional response message in response to determining that the precondition has been satisfied.

In this second implementation, the second period of time may be interrupted by receipt by the BS 102 of either response message indicating that the precondition has been satisfied. Alternatively, the second period of time may be interrupted by a proximate event, such as receipt by the BS 102 of the alert indication 616B, as in the first implementation. Because the alert indication 616B is transmitted in response to the MT 106B determining that the preconditions associated with the MT leg have been satisfied, the second period of time may be considered to be interrupted based on that determination even where the MT 106B is implemented such that the actual trigger for interrupting the first time period is transmission of the alert indication 616B or other proximate event.

As in the first implementation, if the MT leg preconditions are not satisfied within the second period of time, then the BS 102 may transmit a cancelation signal canceling the MT leg of the packet-switched voice call, and initiate a circuit-switched session between the BS 102 and the MT 106B. In this case, there may be no need to cancel the MO leg of the packet-switched voice call, because the MO leg preconditions have already been satisfied. Thus, the voice call may be established with the MO leg being packet-switched and the MT leg being circuit-switched.

It should be understood that the specific signal flow illustrated in FIG. 6 and the described implementations are merely exemplary. In other scenarios, additional or alternative signaling may occur, and different communications protocols (e.g., other than VoLTE/SIP) may be utilized.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE or BS) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An originating user equipment (UE), comprising:
at least one antenna;
a radio coupled to the at least one antenna for performing wireless cellular communications; and
at least one processing element coupled to the radio;
wherein the originating UE is configured to:
    transmit a first invitation for a packet-switched wireless voice call;
    monitor, for at least a portion of a first time period, for one or more predefined connection conditions pertaining to a connection between the UE and a cellular network of the packet-switched wireless voice call, wherein the one or more predefined connection conditions comprise the originating UE determining that the originating UE has met a desired quality-of-service criterion for the packet-switched wireless voice call and the originating UE transmitting an indication that the originating UE has met the desired quality-of-service criterion for the packet-switched wireless voice call;
    cancel the packet-switched wireless voice call in response to determining that the one or more predefined connection conditions have not occurred within the first time period;
    not cancel the packet-switched wireless voice call in response to determining that the one or more predefined connection conditions have occurred within the first time period; and
    receive an indication that a terminating UE of the packet-switched wireless voice call has met one or more second predefined connection conditions, wherein establishment of the packet-switched wireless voice call is completed in response to the indication that the terminating UE has met the one or more second predefined connection conditions.

2. The originating UE of claim 1, wherein the receiving the indication that the terminating UE has met the one or more second predefined connection conditions occurs after the originating UE transmitting the indication that the originating UE has met the desired quality-of-service criterion for the packet-switched wireless voice call.

3. The originating UE of claim 1, wherein the desired quality-of-service criterion comprises establishing a dedicated bearer between the originating UE and the cellular network.

4. An originating user equipment (UE), comprising:
at least one antenna;
a radio coupled to the at least one antenna for performing wireless cellular communications; and
at least one processing element coupled to the radio;
wherein the originating UE is configured to:
    transmit a first invitation for a packet-switched wireless voice call;
    monitor, for at least a portion of a first time period, for one or more predefined connection conditions pertaining to a connection between the UE and a cellular network of the packet-switched wireless voice call, wherein the one or more predefined connection conditions comprise the originating UE determining that the originating UE has met a desired quality-of-service criterion for the packet-switched wireless voice call;
    cancel the packet-switched wireless voice call in response to determining that the one or more predefined connection conditions have not occurred within the first time period;

not cancel the packet-switched wireless voice call in response to determining that the one or more predefined connection conditions have occurred within the first time period; and transmit a second invitation for a circuit-switched wireless voice call in response to canceling the packet-switched wireless voice call.

5. An originating user equipment (UE), comprising:
at least one antenna;
a radio coupled to the at least one antenna for performing wireless cellular communications; and
at least one processing element coupled to the radio;
wherein the originating UE is configured to:
    transmit a first invitation for a packet-switched wireless voice call;
    monitor, for at least a portion of a first time period, for one or more predefined connection conditions pertaining to a connection between the UE and a cellular network of the packet-switched wireless voice call, wherein the one or more predefined connection conditions comprise the originating UE determining that the originating UE has met a desired quality-of-service criterion for the packet-switched wireless voice call;
    cancel the packet-switched wireless voice call in response to determining that the one or more predefined connection conditions have not occurred within the first time period;
    establish a packet-switched wireless voice session with the cellular network at least partly based on a determination that the one or more predefined connection conditions have occurred within the first time period; and
    receive an indication that a terminating UE of the packet-switched wireless voice call has not met one or more second predefined connection conditions, wherein the cellular network establishes a voice call between the originating UE and the terminating UE by establishing a circuit-switched wireless voice session with the terminating UE, wherein the establishing the circuit-switched wireless voice session is at least partly based on the terminating UE not having met the one or more second predefined connection conditions.

6. A method for establishing a voice call between an originating user equipment (UE) and a terminating UE, via a cellular network, the method comprising:
by the originating UE:
    transmitting, to the cellular network, a first invitation for a packet-switched wireless voice call;
    attempting establishment of a first dedicated bearer between the originating UE and the cellular network for the packet-switched wireless voice call;
    not canceling the packet-switched wireless voice call in response to determining that the first dedicated bearer has been established within a first predetermined time period initiated by the transmitting the first invitation, wherein expiration of the first predetermined time period without determining that the first dedicated bearer has been established causes the originating UE to cancel the packet-switched wireless voice call;
    transmitting a first indication, indicating that the first dedicated bearer has been established between the originating UE and the cellular network, wherein the transmitting the first indication is in response to determining that the first dedicated bearer between the originating UE and the cellular network has been established within the first predetermined time period; and
    receiving a second indication, indicating that a second dedicated bearer has been established between the terminating UE and the cellular network, wherein establishment of the packet-switched voice call is completed in response to the second indication.

7. A method for establishing a voice call between an originating user equipment (UE) and a terminating UE, via a cellular network, the method comprising:
by the originating UE:
    transmitting, to the cellular network, a first invitation for a packet-switched wireless voice call;
    attempting establishment of a first dedicated bearer between the originating UE and the cellular network for the packet-switched wireless voice call;
    canceling the packet-switched wireless voice call in response to determining that the first dedicated bearer has not been established within a first predetermined time period initiated by the transmitting the first invitation, wherein determining that the first dedicated bearer has been established within the first predetermined time period causes the originating UE to not cancel the packet-switched wireless voice call; and
    transmitting a second invitation for a circuit-switched wireless voice call to the terminating UE in response to canceling the packet-switched wireless voice call.

8. The method of claim 6,
wherein a second predetermined time period begins in response to the first indication;
wherein the second indication is received within the second predetermined time period.

9. A method for establishing a voice call between an originating user equipment (UE) and a terminating UE, via a cellular network, the method comprising:
by the originating UE:
    transmitting, to the cellular network, a first invitation for a packet-switched wireless voice call;
    attempting establishment of a first dedicated bearer between the originating UE and the cellular network for the packet-switched wireless voice call;
    establishing a packet-switched wireless voice session with the cellular network at least partly based on a determination that the first dedicated bearer has been established within a first predetermined time period initiated by the transmitting the first invitation, wherein expiration of the first predetermined time period without determining that the first dedicated bearer has been established causes the originating UE to cancel the packet-switched wireless voice call; and
    receiving an indication that the terminating UE has not established a second dedicated bearer between the terminating UE and the cellular network for the packet-switched wireless voice call, wherein the cellular network establishes a voice call between the originating UE and the terminating UE by establishing a circuit-switched wireless voice session with the terminating UE, wherein the establishing a circuit-switched wireless voice session is at least partly based on the terminating UE not having established the second dedicated bearer.

10. A base station, comprising:
at least one antenna;
at least one radio coupled to the at least one antenna for performing wireless cellular communications; and
at least one processing element coupled to the at least one radio;
wherein the base station is configured to:
receive, from a mobile originating user equipment (UE), an invitation for a packet-switched wireless voice call;
provide the invitation for the packet-switched wireless voice call to a mobile terminating UE;
receive, from the mobile originating UE, a first indication that the mobile originating UE has met a first quality-of-service precondition for the packet-switched wireless voice call; and
cancel establishment of a first leg of the packet-switched voice call between the base station and the mobile terminating UE in response to determining that the mobile terminating UE has not met a second quality-of-service precondition within a predetermined period of time following the receiving the first indication.

11. The base station of claim 10, wherein the base station is further configured to:
transmit an invitation for a circuit-switched wireless voice call to the mobile terminating UE in response to determining that the mobile terminating UE has not met the second quality-of-service precondition within the predetermined period of time.

12. The base station of claim 11, wherein the base station is further configured to:
complete establishment of a wireless voice call, wherein a second leg of the wireless voice call between the mobile originating UE and the base station is packet-switched, and the first leg of the wireless voice call between the base station and the mobile terminating UE is circuit-switched.

13. The base station of claim 10, wherein the base station is further configured to:
complete establishment of the packet-switched wireless voice call in response to determining that the mobile terminating UE has met the second quality-of-service precondition within the predetermined period of time following the receiving the first indication.

14. The base station of claim 10, wherein at least one of the first quality-of-service precondition and the second quality-of-service precondition comprises establishment of a dedicated bearer for the packet-switched voice call.

15. The base station of claim 10, wherein determining that the mobile terminating UE has not met the second quality-of-service precondition comprises receiving an indication that the mobile terminating UE is providing a user alert of the packet-switched wireless voice call.

16. The base station of claim 10,
wherein the first indication is received within a predefined time period following the invitation.

* * * * *